United States Patent [19]
Cardini et al.

[11] Patent Number: 5,845,392
[45] Date of Patent: Dec. 8, 1998

[54] APPARATUS FOR MANUFACTURING STATORS

[75] Inventors: Giuseppe Cardini, Florence; Roberto Orecchia, Turin, both of Italy

[73] Assignee: Axis USA, Inc., Marlborough, Mass.

[21] Appl. No.: 571,689

[22] Filed: Dec. 13, 1995

Related U.S. Application Data

[63] Continuation of Ser. No. 188,205, Jan. 27, 1994, abandoned.

[51] Int. Cl.$^6$ .................................................. H02K 15/085
[52] U.S. Cl. .............................. 29/736; 29/564.1; 29/596; 29/732
[58] Field of Search ............................... 29/596, 598, 732, 29/736, 734, 564.1; 140/92.1, 92.2

[56] References Cited

U.S. PATENT DOCUMENTS

| | | |
|---|---|---|
| 4,512,376 | 4/1985 | Barrera . |
| 4,570,782 | 2/1986 | Cargill et al. . |
| 4,580,606 | 4/1986 | Barrera . |
| 4,815,673 | 3/1989 | Wheeler . |
| 4,984,353 | 1/1991 | Santandrea et al. . |

*Primary Examiner*—Carl E. Hall
*Attorney, Agent, or Firm*—Fish & Neave; Robert W. Morris; Hallie Kostrinsky

[57] ABSTRACT

Stators having wave wound coil for electric motors or other dynamo-electric machines are manufactured by a production line having a series of interconnecting conveyors running to various processing workstations. The workstations are of three primary types: wave coil forming and insertion stations, prefinishing stations and a final finishing stations. Every workstation of a given type may process any or all phases of a given stator. The stators are transported along the conveyor by pallets which are encoded with information denoting the production status of the stator on the pallet. By providing the workstations with the capability to read the encoded information and adapt themselves for processing based on that information, efficiency is increased because the first available workstation may be selected and individual workstations may be bypassed if other than normal operating conditions are occurring in a workstation without impacting the entire production line. Additionally, minor variations in production rates between workstations are easily absorbed by the production line without a corresponding loss of efficiency.

18 Claims, 7 Drawing Sheets

APPARATUS FOR MANUFACTURING STATORS

CROSS REFERENCE TO THE RELATED APPLICATION

This is a continuation of U.S. application Ser. No. 08/188,205, filed Jan. 27,1994, now abandoned.

BACKGROUND OF THE INVENTION

This invention relates to methods and apparatus for manufacturing stators, more particularly, this invention is directed toward producing stators having undulating or wave wound coils which are formed and inserted into the stator lamination stack.

Armatures and stators for dynamo-electric machines have a broad range of applications. Common examples of the wide use of dynamo-electric machines include: automobile alternators, electric drills, generators, etc. Due to the widespread use of these machines, there is an ever increasing demand for the armatures and stators from which they are typically produced.

In order to meet these demands, machine manufacturers have continued to increase the use of automation. In a typical forming and insertion automated stator manufacturing operation, stators are fed down an assembly line on pallets from workstation to workstation, sequentially, where incremental manufacturing of the stator occurs. These workstations may include such tasks as winding the stator coils (a typical stator has multiple wound coils), insertion of the wound coils within the stator lamination stack, and forming of the coils to accommodate further processing.

Unlike armature windings which are generally wound directly on the armature, stator windings may be produced external to the stator and then inserted into slots in the stator stack. Examples of machines which produce stator coils are described in U.S. Pat. Nos. 4,512,376 and 4,580,606. These patents describe apparatus for forming undulatory (or waveform) stator coils consisting of multi-lobed turns, and for placing the formed coils on an inserter tool. The formed coils are then inserted into the stator stack in a further step.

A single workstation may individually form and insert all of the coils for a stator (typically, three coils are required for a three-phase stator), although this technique tends to be highly inefficient due to the waiting time required while each coil is formed. Depending on the "fill density" of the stator, (a combination of the number of wires per slot and the number of slots per lamination stack) it may also be possible to simultaneously insert multiple wound phases into a single stack using a special insertion tool. Alternatively, each workstation of the stator assembly line may completely perform the forming and insertion of a single coil (corresponding to one phase of the multi-phase stator) and there may be additional workstations for each additional phase of the stator to increase overall efficiency of the assembly line.

Often, a stator assembly line incorporates temporary storage locations to account for a loss of synchronization between workstations. For example, occasionally a downstream station requires more time to complete its task than the previous station; therefore, a slight buildup of pallets in the storage location between the stations occurs. Another common problem which leads to pallet build-up involves temporary shutdowns of a machine for regular maintenance—for example, to refill an empty wirefeed.

To avoid a permanent condition of pallet build-up, the production rates of the various workstations may require frequent calibration, which may cause the higher efficiency machines to be adjusted at a production rate of the lowest efficiency machine in the line—an obviously undesirable condition. Unfortunately, even temporary build-up results in a loss of production efficiency because the upstream station must eventually slow down to permit the downstream station to recover. This problem becomes even more severe when the production rates on multiple stations within the stator assembly line become unequal.

An even greater problem occurs when any single production station in the line must be shut down. As described above, a temporary shutdown for regular maintenance, which may occur on a daily basis, may be completed without having to shut down the entire line, but the storage areas will become significantly backed up. On the other hand, a permanent shutdown of a station essentially shuts down the entire line, causing significant losses in productivity, thereby increasing overhead costs. Therefore, maintenance is often scheduled on multiple machines within an assembly line leading to higher operational costs (e.g., wirefeeds may be replaced before they are empty to coordinate maintenance shutdowns). Obviously, it would be preferable to avoid the severe impacts of having to shut down the entire assembly line due to a single machine. It would be even more advantageous if the assembly line were designed such that machines could be temporarily removed from the line without having to shut down the entire line.

An additional deficiency of previously known stator production lines is related to adjustments in operational capacity. In traditional stator production lines, where components move serially down a line from dedicated machine to dedicated machine, the ability to increase production capacity on the line is limited to the highest production rate of any single machine. Likewise, any reduction is capacity is typically performed by simply lowering the overall production rate, thereby causing production equipment to be used inefficiently.

In view of the foregoing, it would be desireable to be able to provide improved methods and apparatus for manufacturing stators having wound coils.

It would also be desireable to provide improved methods and apparatus for manufacturing stators in which wave wound coils are preformed and inserted within the stator stack.

It would further be desireable to provide a stator manufacturing system having multiple workstations, each workstation being able to preform and insert the wave wound coils in the stator stack.

It would more particularly be desireable to provide a stator manufacturing system which continues to be able operate after a workstation has been shut down.

It would additionally be desireable to provide a stator manufacturing system in which production capacity can easily be adjusted.

SUMMARY OF THE INVENTION

It is an object of this invention to provide improved methods and apparatus for manufacturing stators having wound coils.

It is another object of this invention to provide improved methods and apparatus for manufacturing stators in which wave wound coils are preformed and inserted within the stator stack.

It is a further object of this invention to provide a stator manufacturing system having multiple workstations, each workstation being able to preform and insert the wave wound coils in the stator stack.

It is a more particular object of this invention to provide a stator manufacturing system which continues to be able operate after a workstation has been shut down.

It is an additional object of this invention to provide a stator manufacturing system in which production capacity can easily be adjusted.

These and other objects of the invention are accomplished in accordance with the principles of the invention by stator manufacturing methods and apparatus in which an assembly line having multiple workstations is configured such that the shut down of a workstation does not shut down the assembly line. The individual workstations are provided with the capability to perform multiple functions to prevent a system shut down if a workstation must be shut down. The assembly line is arranged so that incomplete workpieces on pallets can move up or down the assembly line to an idle workstation. The pallets may include coding devices which contain status information regarding the workpieces. The coding devices are read by the workstations to determine the manner of processing to be performed on the workpieces.

The stator manufacturing methods and apparatus of the present invention may also include indexing mechanisms to further increase the efficiency of the manufacturing operations. These indexing mechanisms can adjust the orientation between the workpiece and the tooling to account for different stages of production, such as the insertion of the second coil versus the first coil.

A further advantage of the present invention occurs because the workstations, which are multi-task workstations, are fed workpieces in a non-serial manner. Therefore, production capacity for the line may be increased by merely adding additional workstations to the line (capacity may also be easily decreased by removing workstations from the line). For example, a line producing three phase stators may have any number of forming and insertion workstations to achieve optimal manufacturing efficiency, rather than the three stations of a traditional serial line.

BRIEF DESCRIPTION OF THE DRAWINGS

Further features of the invention, its nature and various advantages will be more apparent from the accompanying drawings and the following detailed description of the preferred embodiments.

DETAILED DESCRIPTION OF THE PREFERRED EMBODIMENTS

The present invention provides improved stator manufacturing methods and apparatus for stators in which coils are formed and inserted into the stator lamination stack. These improvements are accomplished by providing encoded pallets which move along an assembly line configured with multiple workstations so that the pallets are transportable in a cyclical manner to any of the workstations. Reading devices read the coded information in order to determine the current production requirements for each pallet. The conveyor system then transports the pallet to the first available workstation, which performs the forming and insertion of whichever coil is currently required based on the coded information.

Figure 1:
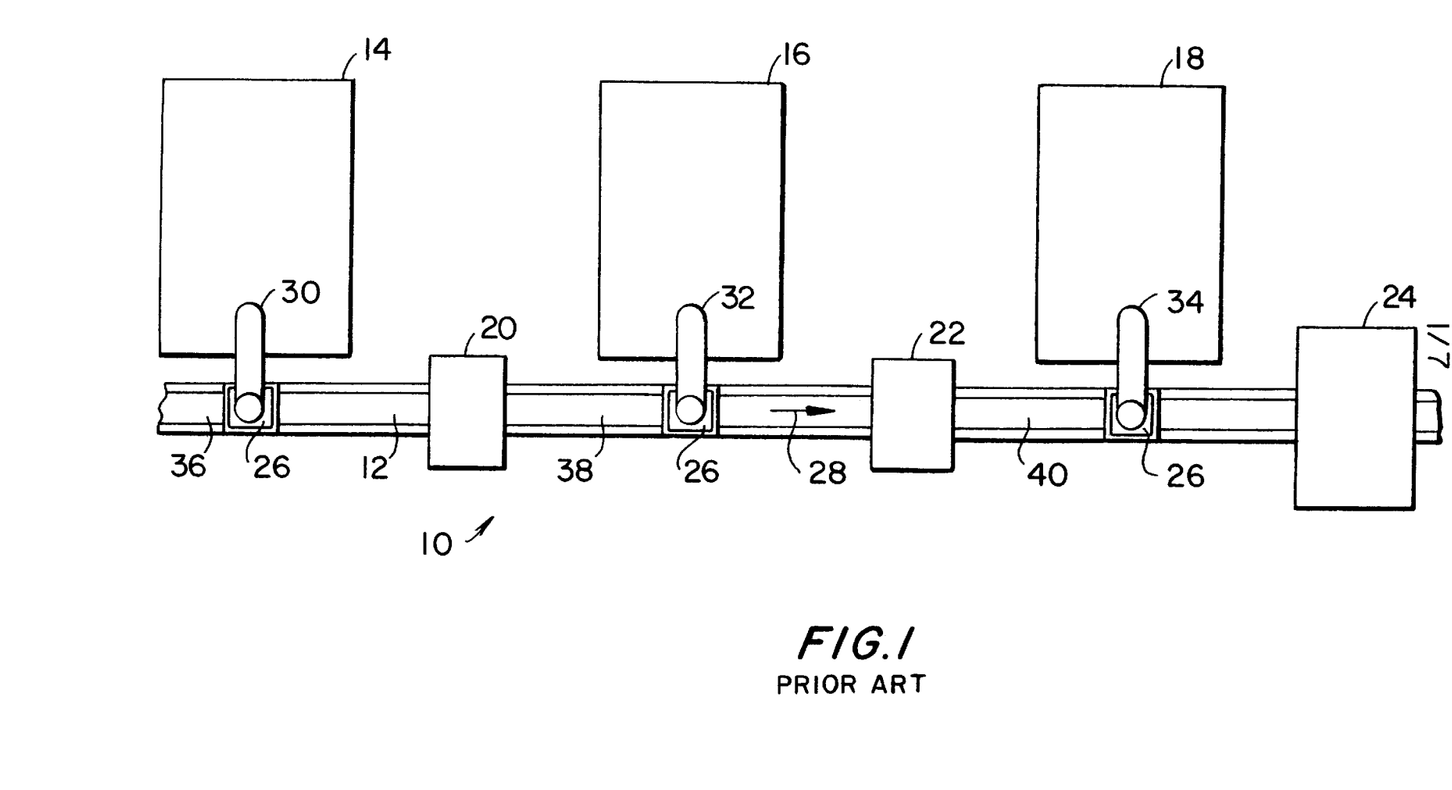
FIG. 1 is a simplified plan view of an illustrative embodiment of a typical prior art stator production apparatus. Some components are shown in block diagram form in FIG. 1.
Figure 2:
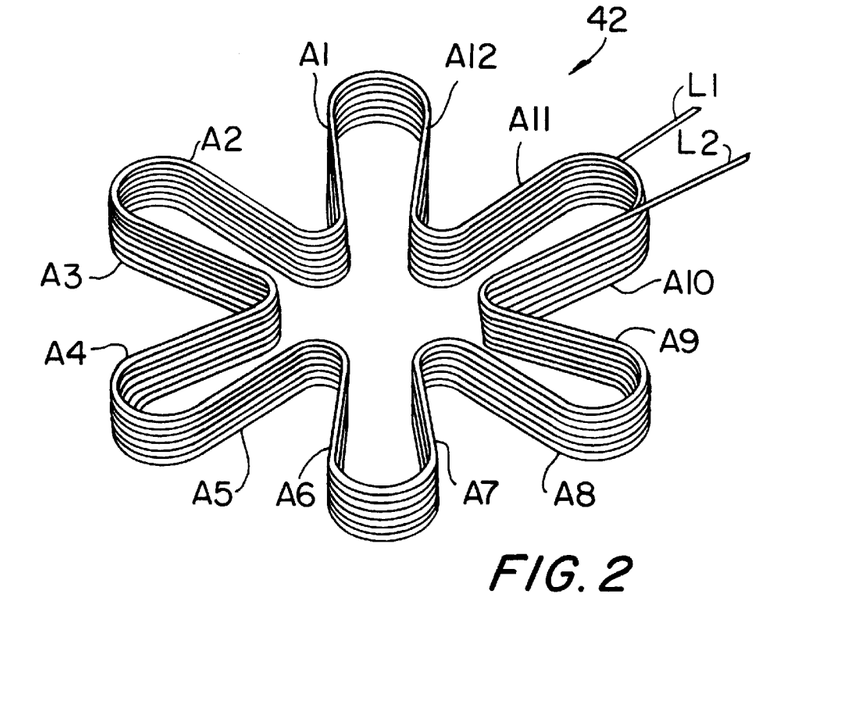
FIG. 2 is an isometric view of a formed stator coil which will be inserted into a stator lamination stack during the production of the stator.
Figure 3:
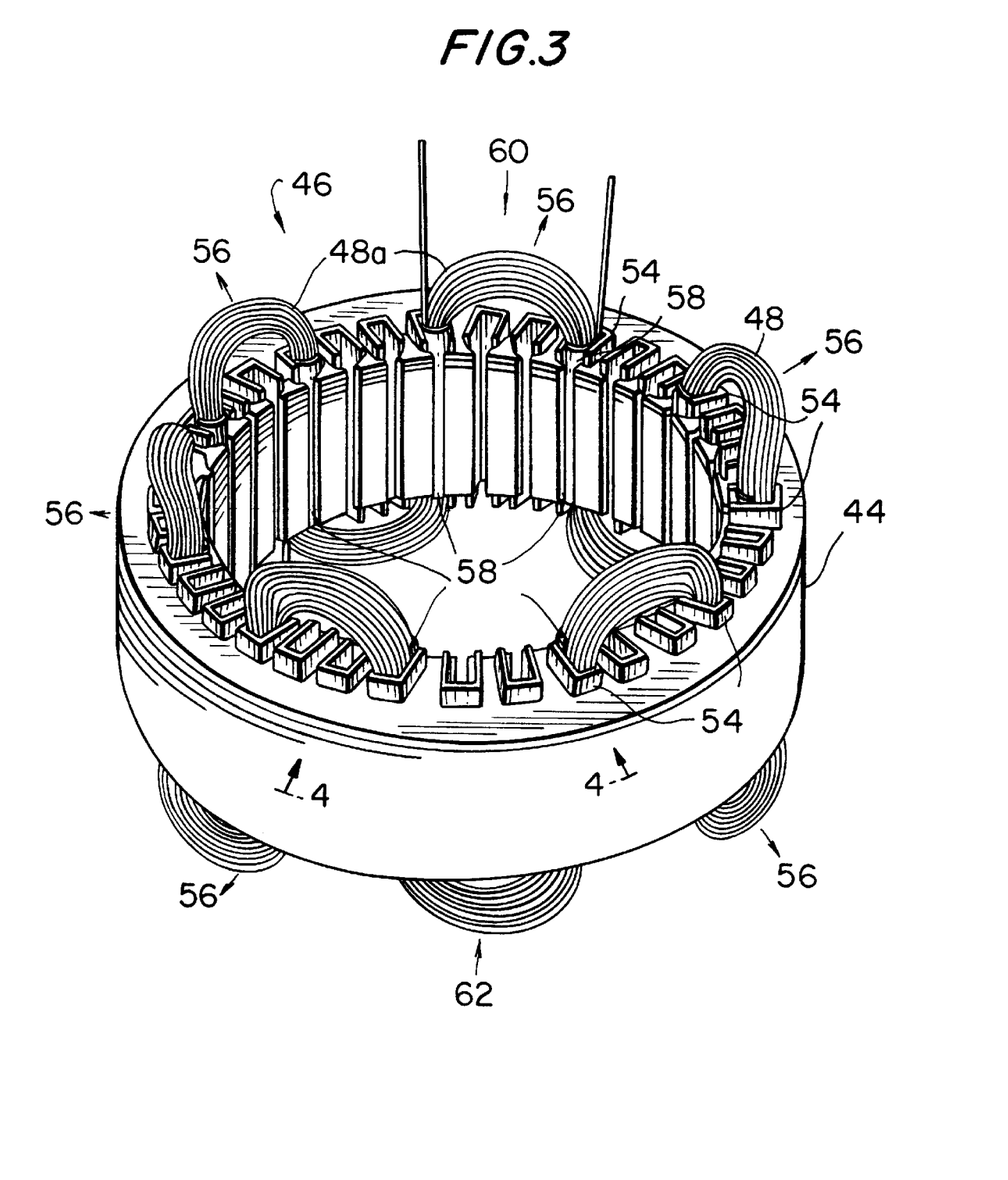
FIG. 3 is an isometric view of a stator with one stator coil inserted therein.

Referring to FIGS. 1–4, a typical previously known stator production line 10 is shown to include a conveyor 12 and six workstations 14, 16, 18, 20, 22 and 24. Workstations 14, 16 and 18 may comprise machinery for forming stator coils 42 (FIG. 2) and machinery (not shown) for inserting the formed coil into the stator lamination stack 44 (FIG. 3). Workstations 20 and 22 may be prefinishing machines (not shown) which prepare the incomplete stator 46 (FIG. 3) for downstream processing. Work station 24 also performs finishing to the stator 46, but this occurs after all of the coils 42 have been formed and inserted into the stator stack 44.

The line 10 includes three forming and insertion stations 14, 16 and 18 to produce a three phase stator 46. The production process begins when a stator stack 44 is placed on pallet 26, which carries the stack 44 along conveyor 12 in direction 28. When pallet 26 reaches first workstation 14, a transfer device 30 transfers the stack 44 from pallet 26 to station 14. The transfer occurs such that a specific, known orientation always exists between the stator stack 44 and the tooling (or machinery). In this manner, the tooling may perform its operation without having to verify the current condition of the stator stack 44.

Station 14 may include coil forming apparatus of the type described in above-identified U.S. Pat. Nos. 4,512,376 and 4,580,606. FIG. 3 shows a multi-lobed coil 48 which has been formed and inserted into every third slot 54 of stator stack 44 (corresponding to one of the three phases). After coil 48 has been formed and inserted, station 14 may insert wedges 58 to close the open side of the slots 54, thereby holding coils 42 in place.

After the completion of processing first phase coil 48, transfer device 30 transfers stator stack 44 from station 14 back to pallet 26, which continues to move along conveyor 12 to prefinishing station 20. As described above, the transfer process results in stator stack 44 having the same orientation on pallet 26 as it had before it was processed by station 14.

Figure 4:
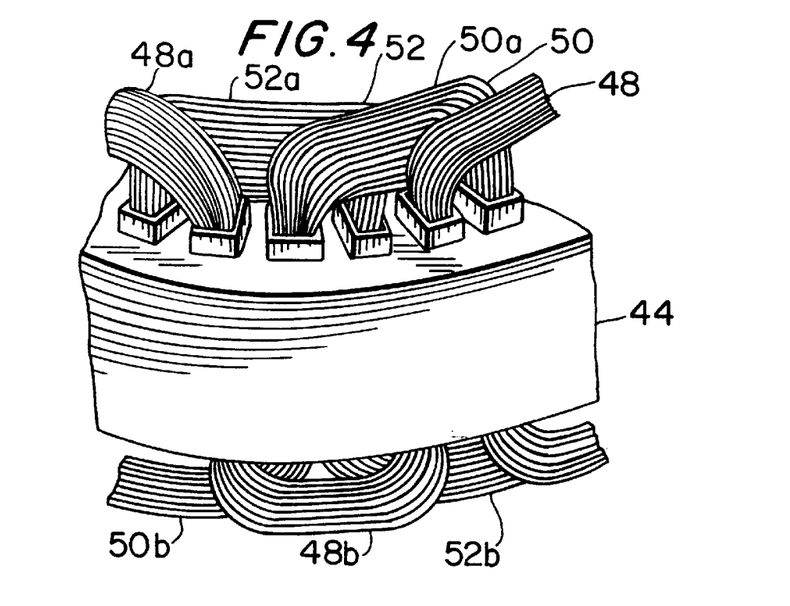
FIG. 4 is a partial isometric view of the stator of FIG. 3 taken along line 4—4, with the stator having two additional phase coils inserted therein.

Prefinishing station 20 prepares stator 46 for insertion of the next wave wound coil 50 by applying a radial pressure along radii 56 on the external portions 48a and 48b of inserted coil 48. This process gently bends portions 48a and 48b away from the center of stator stack 44 to clear the way for the insertion of second coil 50 and third coil 52. Additionally, station 20 also maintains a specific, known orientation between pallet 26 and stator stack 44. The orientation may be such that stator stack 44 leaves station 20 in the same orientation as it arrived in, or any other known orientation.

Stator stack 44 is transferred by transfer device 32 to station 16 for forming and insertion of second wave wound coil 50 into it respective slots 54. As previously described, transfer device 32 places stator stack 44 in station 16 such that orientation between station 16 and stator stack 44 is maintained in a known, specific relationship. Station 16 forms and inserts coil 50 into stator stack 44 in the same manner as performed by station 14 on coil 48. Upon completion, stator stack 44 is again returned to pallet 26 which transports stack 44 to prefinishing station 22. Station 22 performs essentially the same process as station 20, but acts on coil 50 instead of coil 48. During prefinishing, station 22 may index stator stack 44, but upon completion of prefinishing, stator stack 44 will be returned to a specific known orientation.

For insertion of last coil 52, stator stack 44 is transferred from pallet 26 by transfer device 34 to station 18. Stations forms and inserts third coil 52 into stator stack 44 in the same manner as stations 14 and 16. When station 18 has completed processing of stator 46, all slots 54 are filled with one of the three coils and all of the wedges 58 are installed to hold the coils in place. Transfer device 34 returns stator 46 to pallet 26 which transports it to final finishing station 24.

Final finishing station 24 performs a task which is essentially the opposite of that performed by the other prefinishing stations 20 and 22. Each of the external portions of coils 48, 50 and 52 are compressed toward, rather than away from, stack 44—upper portions 48a, 50a and 52a are compressed radially inward along radii 56 toward the center of stack 44 while also being compressed in direction 60, and lower portions 48b, 50b and 52b are compressed radially along radii 56 toward the center of stack 44 while also being compressed in direction 62. Directions 60 and 62 are parallel to, and collinear with, the axis which runs through the bore of stator stack 44. After processing by station 24, the completed stator 46 continues down conveyor 12.

When everything is running smoothly, assembly line 10 may provide an efficient means for producing stators. However, line 10 has several drawbacks which are magnified when difficulties occur on the line. During optimal conditions, the manufacturing rate of each station and the conveyor will be preferably substantially matched so that an orderly flow of stators occurs. When any station or the conveyor experiences a problem which affects its production rate, that problem will impact the entire line. Commonly, production lines attempt to absorb these impacts by having storage areas where pallets containing incomplete workpieces wait for further processing. Line 10 utilizes storage areas 36, 38 and 40 to store pallets waiting for processing by stations 14, 16 and 18, respectively.

Unfortunately, once pallets begin to back up into a storage area from mismatched production rates or regular maintenance shutdowns (i.e., temporary shutdowns where the line remains operational), the corresponding loss of productivity cannot be recovered unless the initial rate of pallets is reduced (which is obviously inefficient). Additionally, the serial arrangement of the line requires that the entire line be shutdown if one station must be permanently shut down, or if a maintenance shutdown cannot be rapidly completed. Therefore, even routine maintenance must be carefully coordinated to keep system-wide shutdowns at a minimum.

Figure 5:
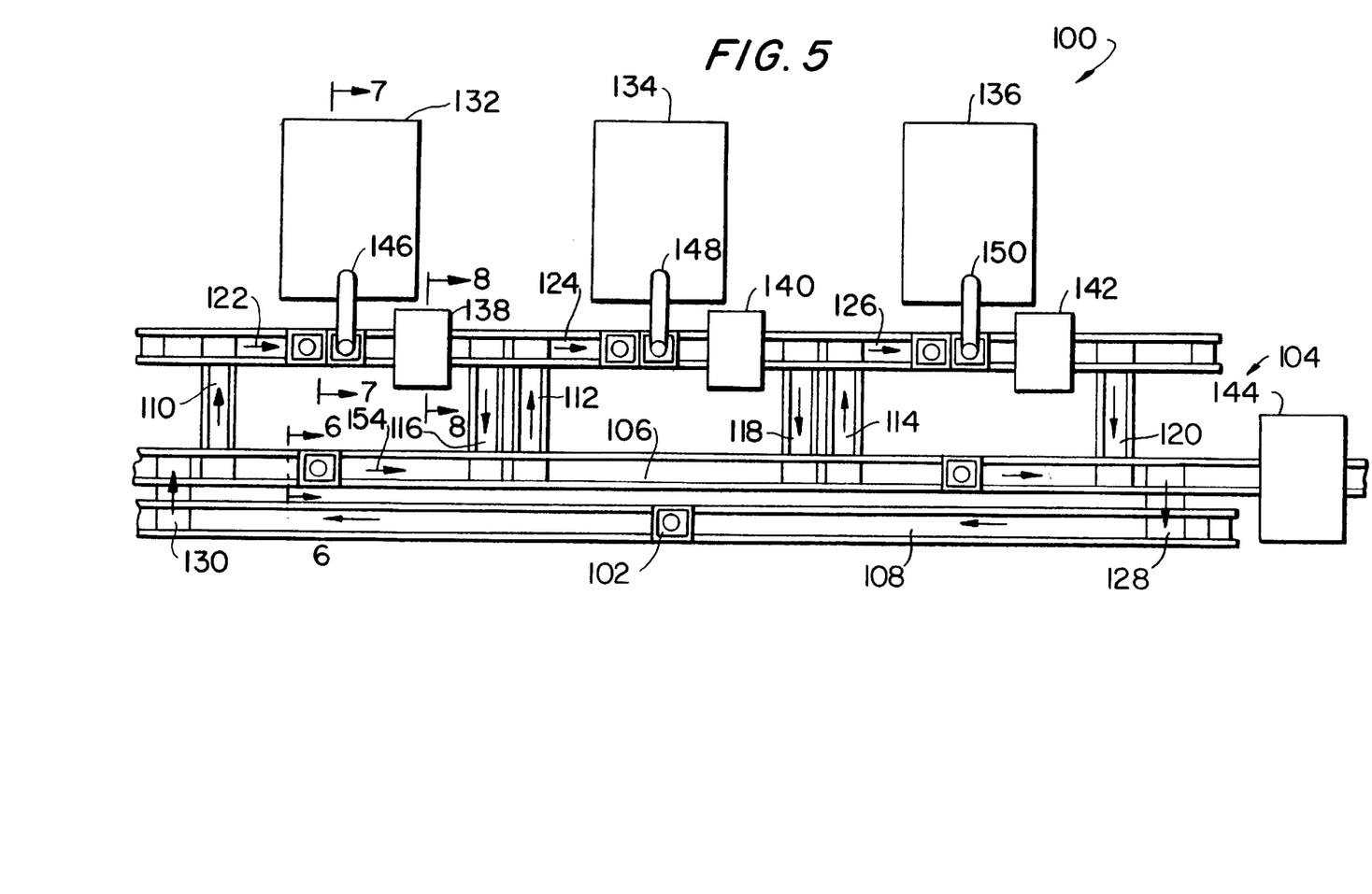
FIG. 5 is a simplified plan view of an illustrative embodiment of stator production apparatus constructed in accordance with this invention. Some components are shown in block diagram form in FIG. 5.

FIG. 5 shows an illustrative embodiment of stator production line 100 constructed in accordance with the principles of this invention which greatly reduces the impact of normal operational difficulties experienced by traditional stator assembly lines. Stator bodies 44 are transported along stator line 100 on pallets 102, which are substantially improved versus pallets 26 as is described below. The pallets are transported along a series of conveyors 104 to the various workstations for processing. Conveyors 104 comprise main conveyor 106, return conveyor 108, loading conveyors 110, 112 and 114, unloading conveyors 116, 118 and 120, station conveyors 122, 124 and 126, and recycle conveyors 128 and 130.

One immediately apparent advantage of stator line 100 over traditional serial stator lines is the fact that the pallets may be directed to bypass an inoperable workstation. For example, if workstation 132 had a failure and was shut down (or was merely temporarily shutdown for regular maintenance), pallets 102 could bypass loading conveyor 110 and proceed directly to loading conveyor 112. As described in more detail below, this operational flexibility is also advantageous for less severe situations than total shutdown.

Production line 100 further includes three coil forming and insertion workstations 132, 134 and 136, three prefinishing workstations 138, 140 and 142, a final finishing station 144, and three transfer devices 146, 148 and 150. All of the forming and insertion workstations are essentially identical, each having wave wound coil forming apparatus preferably of the type described in above-identified U.S. Pat. Nos. 4,512,376 and 4,580,606. Workstations 132, 134 and 136 also include the capability to insert the wound coils 42 into the stator bodies 44. Prefinishing stations 138, 140 and 142 are substantially identical, each having the ability to prefinish inserted coils in preparation for the insertion of additional coils.

Figure 6:
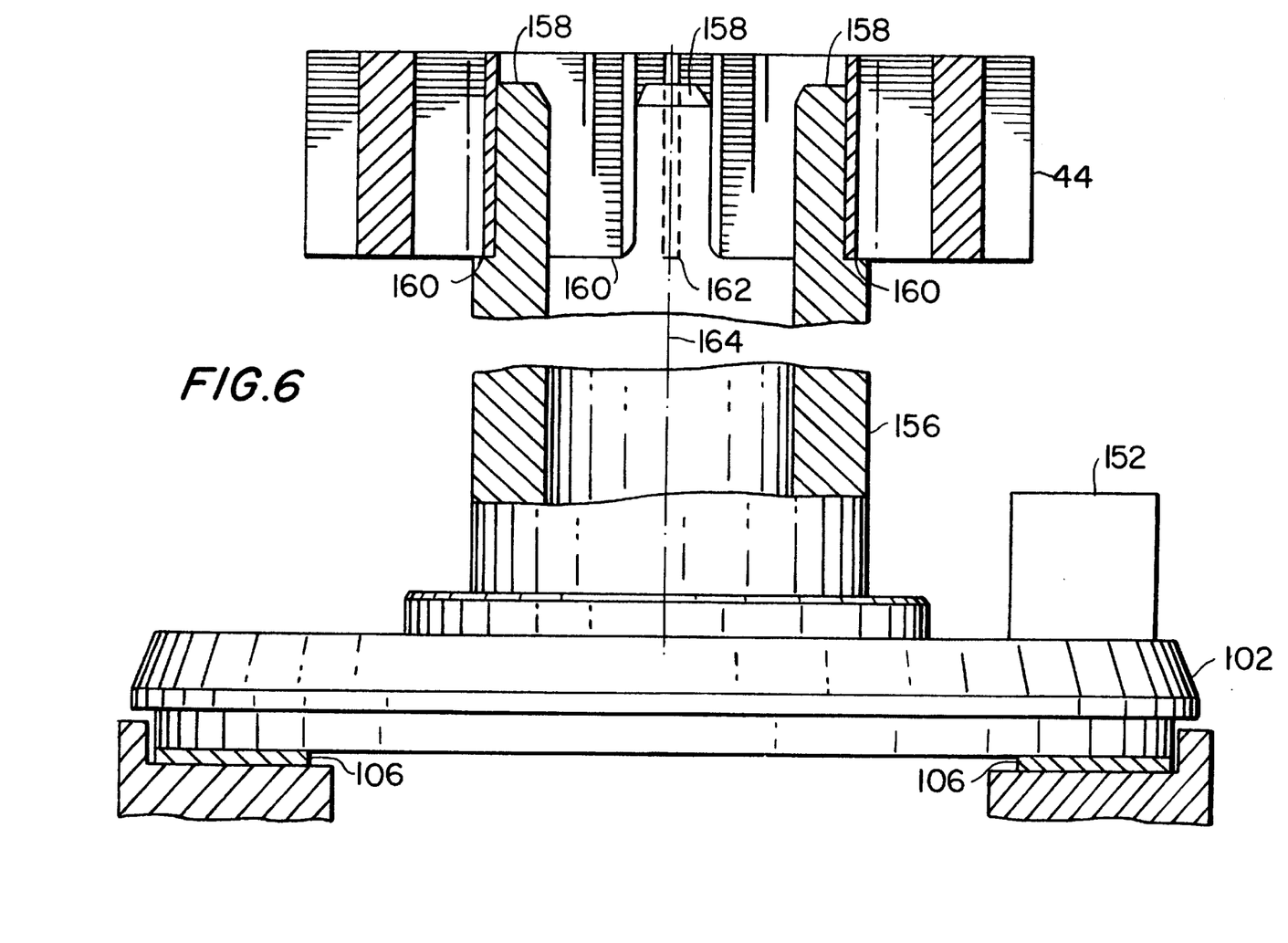
FIG. 6 is an elevational view of an illustrative embodiment of a pallet supporting a stator of the apparatus shown in FIG. 5 taken along line 6—6 in FIG. 5.

As shown in FIG. 6, each pallet 102 is provided with an encoding device 152 which stores information regarding the workpiece or workpieces it is carrying as it travels along conveyors 104. The information is encoded in a known way such that it can be read and revised at various points throughout assembly line 100. U.S. Pat. No. 4,984,353 describes one example of the use of such encoded pallets. The encoded information may include the number and type of workpieces on the pallet as well as the current production status of those workpieces (e.g., two stators, each having had a first coil inserted therein).

The operation of stator line 100 will now be described. Pallets 102 are introduced to conveyors 104 on main conveyor 106 which is moving in direction 154. The pallets 102 are then transferred to loading conveyors 110, 112 or 114 depending on the state of operation. Under normal operating conditions, pallet 102 will be transferred to conveyor 110—assuming station 132 is the first available station—which then transfers pallet 102 to station conveyor 122. When pallet 102 reaches transfer device 146, coding device 162 is read to determine the status of the workpieces on the pallet. Transfer device 146 then transfers the stator lamination stack 44 to workstation 132 oriented such that empty slots 54 are presented to workstation 132 for insertion of a wound coil 42 (each transfer device may actually be a part of the corresponding workstation).

Upon completion of the insertion process, which is described in detail below, transfer device 146 returns stator stack 44 to pallet 102 and coding device 152 is revised to indicate that a first coil 42 has been inserted into stator stack 44. Pallet 102 is moved along station conveyor 122 to prefinishing station 138 where the coding device 152 is read. In this case, coding device 152 provides information indicating that additional coils must be inserted, therefore, protruding portions 48a and 48b of coil 48 are pressed radially outward as described above with respect to prefinishing stations 20 and 22. Pallet 102 may then be returned to conveyor 106 via return conveyor 116, which transfers pallet 102 to the next available station.

Alternatively, if there are no substantial difficulties with station 134 (i.e., its queue is not full), pallet 102 may be transferred from conveyor 122 to conveyor 124, otherwise, pallet 102 will be transferred to unloading conveyor 116. Assuming the pallet 102 is on conveyor 124 (from either conveyor 122 or from conveyor 112), the pallet will reach transfer device 148 where coding device 152 is again read. Forming and insertion station 134 receives information from the reading of coding device 152 which indicates that the first coil has been inserted. Transfer device 148 then transfers stator stack 44 to station 134 such that empty slots 54 are presented to station 134 for insertion of a second coil 42.

After the second coil 50 has been inserted into stack 44, transfer device 148 returns stack 44 to pallet 102 and coding device 152 is again revised. Pallet 102 is then presented to prefinishing station 140 where the coding device 152 is read. In this case, coding device 152 provides information indicating that additional coils must be inserted, therefore, protrusions 50a and 50b of second coil 50 are pressed radially outward in a manner similar to that described for station 138. Pallet 102 is then transferred to station conveyor 126 (assuming there is no substantial backup there; otherwise, pallet 102 is transferred to unloading conveyor 118).

Pallet 102 next travels to transfer device 150 and coding device 152 is again read. Coding device 152 indicates that one more coil 42 must be inserted into stack 44, so transfer device 150 transfers stack 44 to station 136 such that the remaining empty slots 54 are presented to station 136. After insertion of coil 52, transfer device 150 returns stack 44 to pallet 102 and coding device 152 is revised to indicate that all coils have been inserted. When pallet 102 reaches prefinishing station 142, coding device 152 is read, and it indicates that all coils have been inserted. Prefinishing station 142 will then ignore pallet 102 and transfer it to unloading conveyor 120 without any processing by station 142.

Pallet 102, which is transferred from conveyor 120 to main conveyor 106, travels along conveyor 106 until it reaches recycle conveyor 128, at which point coding device 152 is read again. If all of the coils 48, 50 and 52 have been inserted into stack 44, pallet 102 continues on conveyor 106 to final finishing station 144; otherwise, pallet 102 is transferred to recycle conveyor 128 which transfers it to return conveyor 108. Finishing station 144 operates in essentially the same manner as finishing station 24 to compress all of the protruding portions of coils 48, 50 and 52 toward stator stack 44.

Each of station conveyors 122, 124 and 126 includes an area where a small number of pallets 102 can be queued up while waiting for processing in stations 132, 134 and 136, respectively. Once pallets 102 enter a queue, they are advanced sequentially through each station on the corresponding conveyor until they reach an unloading conveyor. If there is a substantial backup on the corresponding station conveyor, i.e., the queue is full, or if the corresponding station is shut down, pallet 102 bypasses the loading conveyor and continues to the next loading conveyor (unless the bypassed loading conveyor is conveyor 114, in which case pallet 102 will be transferred to recycle conveyor 128).

It should be apparent that each workstation 132, 134 and 136 can form and insert any of coils 48, 50 and 52. Therefore, when a station is bypassed, the next available station performs the next required task. For example, if a pallet 102 bypasses station 132 and enters the queue at station 134, station 134 may form and insert first coil 48 and does not have to form and insert second coil 50. In fact, a single station may end up individually forming and inserting all three coils 48, 50 and 52 into a single stack 44, but that would entail pallet 102 passing through the corresponding queue three times.

It is highly inefficient to have stack 44 remain in single station waiting for each of the three coils 48, 50 and 52 to be formed when the coils are separately inserted. However, if the fill density is small enough (i.e., the wires are not tightly packed), a single station may simultaneously form multiple coils for a stator stack and insert them using a special insertion tool. For example, a station may form three coils, place them on a single insert tool and insert all three during a single insertion step. In that case, the line of the present invention is still advantageous over previously known lines because it enables the empty stack to be routed to the first available station.

Once pallet 102 has bypassed any of stations 132, 134 and 136, pallet 102 will be transferred to recycle conveyor 128 and to return conveyor 108 so that the remaining coils may for formed and inserted. Return conveyor 108 feeds pallet 102 to recycle conveyor 130 which transfers the pallet to the starting point on main conveyor 106. At that point, pallet 102 will travel to the first available station to attempt to complete the production of stator 46.

For example, assuming station 134 is shut down and the first coil 48 has been formed and inserted by station 132. Pallet 102 will bypass conveyor 112 and be transferred to conveyor 114. When the pallet reaches transfer device 150, coding device 152 will be read and will indicate that coil 48 has been formed and inserted. Transfer device 150 then transfers stack 44 to station 136 such that the slots corresponding to coil 50 are presented to station 136. Coil 50 is then formed and inserted and coding device 152 is updated.

Pallet 102 will eventually make its way back to conveyor 110 (travelling along conveyors 120, 128, 108, 130 and 106 on the way) which places pallet 102 in the queue for station 132. At transfer device 146, coding device 152 is read again, and it indicates that only coil 52 needs to be inserted. Transfer device 146 transfers stack 44 to station 132 so that slots 54 which correspond to coil 52 are presented to station 132 and the insertion process is completed. After coding device 152 is read at prefinishing station 138, pallet 102 is transferred directly to main conveyor 106. Additional coding device readers (not shown) may be placed at the transfer points between conveyor 106 and conveyors 112 and 114 so that completed stators are transported directly to finishing station 144.

To accommodate the orientation requirements of the system, pallets 102 must be designed such that orientation of stack 44 is always known. FIG. 6 shows one embodiment of the present invention in which a support 156 is mounted to pallet 102 to support a single stator stack 44. Support 156 includes posts 158, each having a shelf 160 which maintains stack 44 such that stack 44 is easily accessible to various processing equipment. One of posts 158 also includes a key 162 for engaging the sides of one of slots 54 in stator stack 44 to insure that the correct angular orientation is maintained. Stack 44 is removed from, or replaced on, posts 158 parallel to axis 164.

Figure 7:
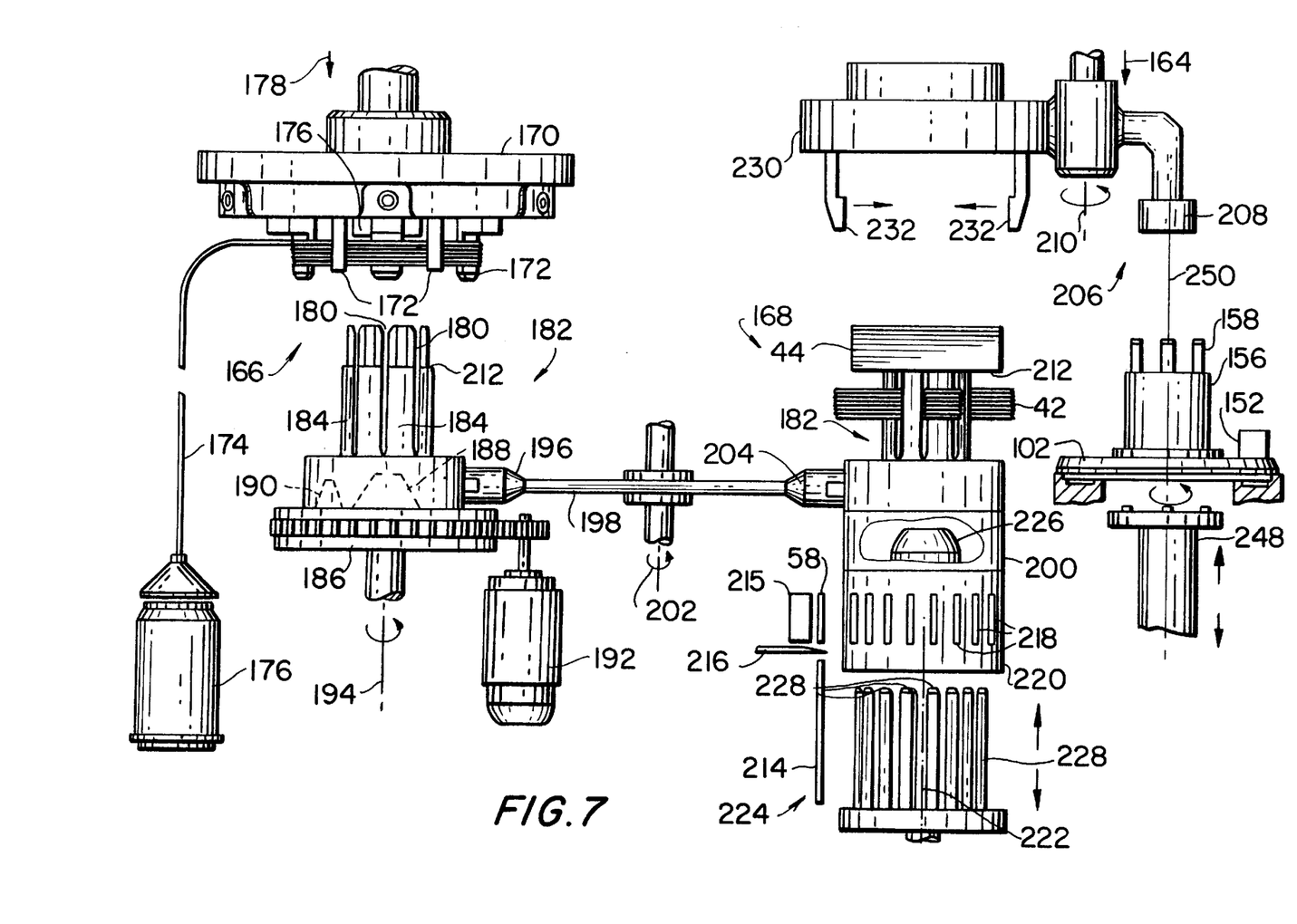
FIG. 7 is an elevational view of an illustrative embodiment of the coil forming and inserting machines of the apparatus shown in FIG. 5 taken along line 7—7 in FIG. 5.

FIG. 7 shows a partial example of the forming and insertion equipment which may be installed in workstations 132, 134 and 136. There are typically two basic units in each workstation, a forming unit 166 and an insertion unit 168. Forming unit 166 may have a rotating head 170 and forming members 172 of the type described in above-mentioned U.S. Pat. Nos. 4,512,376 and 4,580,606. Wirefeed 174 feeds wire from supply drum 176 as rotating head 170 rotates and interacts with forming members 172 to form coil 42.

After a wire cutter (not shown) terminates the coil from wire feed 174, transfer members 176 push formed coil 42 in direction 178 so that the coil is moved from forming members 172 to the aligned spaces 180 of insertion tool 182. Spacings 180 in insertion tool 182 correspond to equally distributed circumferential spaces present between lamellae 184 of tool 182. The number of lamellae 184 and spacings 180 correspond to the number of slots 54 where one phase coil 42 needs to be inserted.

For example, as shown in FIG. 2, each arm A1, A2, ..., A12 of coil 42 must be inserted into a respective spacing 180 of tool 182. Therefore, the angular distance between adjacent spacings 180, or between adjacent lamellae 184, should be substantially equal to the angular distance between adjacent slots 54 of the stator being filled. Insertion tool 182 may be aligned with the forming members by being seated on an indexing table 186. Table 186 typically has a centering nose 188 and an angular orienting pin 190 which engage corresponding seats (not shown) of tool 182 to obtain alignment.

Once coil 42 has been transferred to insertion tool 182, tool 182 may be rotated by indexing table 186 (and drive mechanism 192) about axis 194 to orient leads L1 and L2 of coil 42 in relation to an absolute reference. This rotation may be necessary to set the angular position of leads L1 and L2 in relation to the slot orientation of the stator stack 44 when coil 42 is inserted into the stack. Gripper 196 of rotating arm 198 removes tool 182 from table 186 and places it on insertion table 200. Typically, the action of rotating arm 198 will be a 180° rotation about axis 202 so that opposing gripper 204 (of arm 198) simultaneously returns an empty tool 182 to indexing table 186. This simultaneous action provides a further increase in efficiency because coil forming and transfer may occur simultaneously with coil insertion.

Once tool 182 has been placed on insertion table 200, pick and place device 206 may remove a stator stack 44 from a pallet 102 and place it on tool 182 for insertion of coil 42. Device 206 includes a male manipulator 208 which moves along axis 164 through the bore of stator stack 44 to grip stack 44 and then returns to a predetermined position. If required, lifter 248 may lift pallet 102 and rotate it about axis 250 to align slots 54 with the corresponding coil to be inserted. In many instances, this task may alternatively be performed by indexing table 186, however, when multiple coils are being inserted using a special insertion tool (not shown), both indexing mechanisms 186 and 248 may be necessary for aligning stack 44 with coils 42.

Device 206 rotates about axis 210 (typically a 180° rotation) to align stator stack 44 with the insertion tool 182 on insertion table 200. Device 206 again travels along axis 164 and places stack 44 on shelves 212 of insertion tool 182. Shelves 212 are similar to shelves 160 of posts 158 such that when stator stack 44 is set in place, the coil arms of coil 42 are aligned with the slots 54 where they will be inserted.

Before coil 42 can be inserted into stack 44, wedges 58 must be prepared for closing slots 54 after coil insertion. Material 214 is fed to a wedge cutter 216 and placed in seats 218 of a drum 220. Drum 220 has seats 218 having an angular separation corresponding to each slot 54 of stack 44 (for a single phase coil 42). As drum 220 is indexed about axis 222, feed member 214 inserts a wedge 58 into a corresponding seat 218. Once all of the seats 218 have been filled, the drum 220 is angularly oriented about axis 222 so that the seats are aligned with the slots 54 to be inserted. The seats 218 having openings at the end closest to insertion table 200 to enable wedges 58 to be inserted into slots 54 through insertion table 200.

Once the arms of coil 42 are aligned with the corresponding stator slots 54 and drum 220 is loaded with wedges 58, pusher unit 224 moves along axis 222 to insert coil 42 and wedges 58. Pusher unit 224 includes a plunger 226 which moves through tool 182 and comes in contact with the arms of coil 42. At the same time, wedge pushers 228, which are aligned with seats 218 of drum 220, are also moved through tool 182 so that wedges 58 follow the arms of coil 42 through slots 54. As shown in FIG. 3, this results in the insertion of coil 42 and wedges 58 into slots 54 of stator stack 44.

The processed stator 46 may now be picked up by an opposing arm 230 of pick and place device 206. The pick-up of the processed stator may be accomplished by having a pair of grippers 232 located on arm 230 which grasps the outside of stator stack 44. As was described for rotating arm 198, overall efficiency may be greatly improved when pick and place device 206 performs multiple operations simultaneously. As device 206 is lowered to receive an insertable stator stack 44, a "just inserted" stator stack 44 may be simultaneously grasped. When device 206 rotates, the processed stator stack 44 is returned to a pallet 102 while a "to be processed" stator stack 44 is placed onto insertion tool 182. Lifter 248 may also be used to index pallet 102 to its original angular position before it is returned to the appropriate conveyor.

It should be apparent to the practitioner that various different configurations of indexing within each workstation are possible, without departing from the scope and spirit of the present invention. For example, if gripper 196 requires insertion tool 182 to be in a specific orientation for transfer to insertion table 200, lifer 248 may perform the indexing of stack 44 to align it with the coils 42 to be inserted. On the other hand, if gripper 196 may grip and transfer insertion tool 182 from any given orientation, all indexing may be performed by either indexing table 186 or lifer 248 and, to reduce overall system costs, the indexing capability may removed from the otherwise idle workstation component.

It should also be apparent that the workstation shown in FIG. 7 may be implemented with both normal insertion tool 182 and a special insertion tool (not shown) for inserting multiple coils simultaneously (as previously described). The workstation would select the correct tool based on the information supplied by coding device 152. In this case, coding device 152 could indicate the fill density of its stator, which would be used to determine whether multiple insertions could be performed with the special tool or if individual insertion steps are required.

Figure 8:
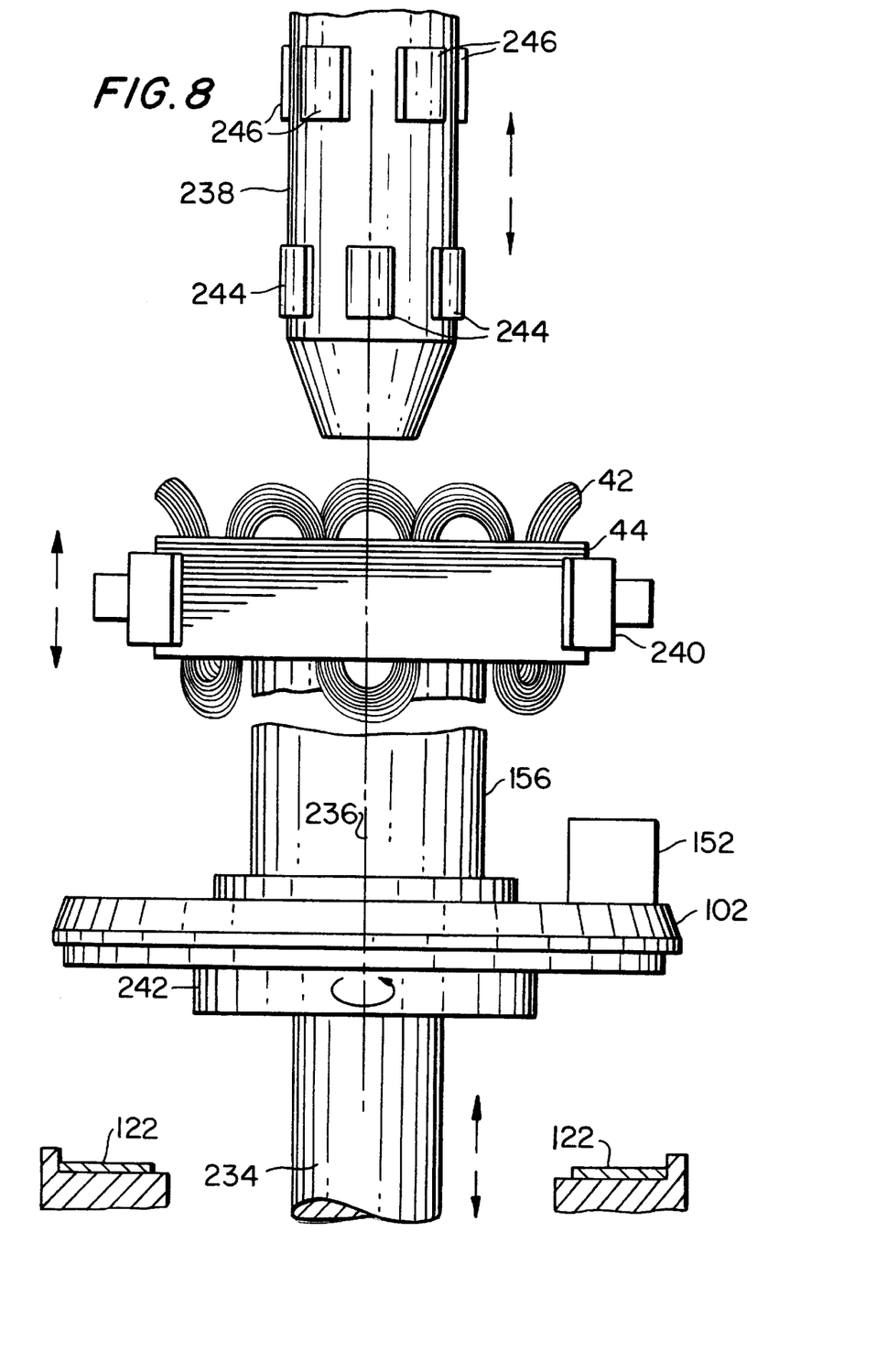
FIG. 8 is an elevational view of an illustrative embodiment of a prefinishing machine of the apparatus shown in FIG. 5 taken along line 8—8 in FIG. 5.

FIG. 8 refers to a representative example of prefinishing stations 138, 140 and 142 (for clarity, only station 138 will be referenced in this description, but the description applies equally to stations 140 and 142). Prefinishing station 138 includes a lifting device 234, which raises and lowers pallet 102 along axis 236, a male former 238, a gripper 240 and an indexer 242, all of which are aligned concentric with axis 236 (as is support 156 of pallet 102).

The indexer 242 aligns stator stack 44 with former 238 for prefinishing. Then, gripper 240 removes stator stack 44 from support 156 and raises it along axis 236 until male former 238 is inserted into the bore of stator stack 44 a predetermined distance. This distance guarantees that expandable members 244 and 246 of former 238 are aligned with the corresponding portions 48a and 48b of coil 48 (or coils 50 and 52). The expandable members 244 and 246 are moved radially outward from axis 236 such that they exert pressure on portions 48a and 48b causing them to be cleared away from the bore of stator stack 44 (for the insertion of other coils).

Each of the respective group of stations, the forming and insertion stations 132, 134 and 136, and the prefinishing stations 138, 140 and 142, is capable of processing any of the three phase windings which need to be inserted into the stator. The use of coding devices and indexing mechanisms permit rapid and efficient orientation of the stator stack before each processing step occurs. In this manner, any of the six stations may be shut down without shutting down the entire assembly line. Additionally, if any of the stations has a problem which decreases its production rate, the mismatched rates will have a reduced impact on overall operation because the other stations can more rapidly absorb extra production needs.

It will be understood that the foregoing is only illustrative of the principles of this invention, and that various modifications can be made by those skilled in the art without departing from the scope and spirit of the invention. For example, indexing may be performed by the pick and place devices (transfer devices) so that each stator stack which is introduced to a processing station is already aligned for processing. This may reduce the requirements for indexing equipment and permit production at even higher rates. Additionally, rather than the rectangular arrangement of conveyors shown in FIG. 5, the present invention could just as easily be applied to a circular arrangement of conveyors, where the workstations are arranged around the circumference of the ring and the pallets are cyclically transported to the first available workstation around the ring until they are fully inserted. Other conveyor arrangements may also be implemented without departing from the scope and spirit of the invention.

One skilled in the art will appreciate that the present invention can be practiced by other than the described and suggested embodiments, which are presented for purposes of illustration and not of limitation, and the present invention is limited only by the claims which follow.

The invention claimed is:

1. A production line for manufacturing stators, each stator having a stator stack and a plurality of wave wound coils which are formed and inserted into said stator stack, said production line comprising:

a plurality of pallets, each of said pallets being able to carry at least one said stator stack and having a coding device which stores at least information denoting contents of said pallet and production status of said contents;

a plurality of conveyors arranged so that said pallets are transported in a cyclical manner along said production line; and a plurality of forming and insertion machines configured along said production line such that said conveyors transport said pallets up or down said production line to a first available or any of said machines, said machines forming at least one of said wave wound coils by forming said at least one coil and placing said at least one coil into an insertion tool and inserting said at least one coil in said stator stack by transferring said at least one coil from said insertion tool to said stator stack and being configured such that each of said machines selectively forms and inserts a phase wave wound coil in response to said information on said coding device, said machines having normal operating conditions.

2. The production line of claim 1 wherein said conveyors are configured such that said pallets are transferred to a first available of said machines for forming and insertion of said at least one wave wound coil into said stator stack.

3. The production line of claim 2 wherein said conveyors are configured such that a selected machine is bypassed by said pallets if said selected machine is operating at other than said normal operating conditions.

4. The production line of claim 1 wherein said stator stack on said pallet may be cycled along said conveyors past said machines such that any combination of at least one of said machines may form and insert all of said at least one phase wave wound coil for a single stator stack.

5. The production line of claim 4 wherein all of said at least one coil of said stator stack are formed and inserted by a single one of said machines.

6. The production line of claim 4 wherein each of said at least one coil of said stator stack is formed and inserted by a different one of said machines.

7. The production line of claim 1 wherein each of said forming and insertion machines comprises:

a forming machine for forming said at least one wave wound coil;

an insertion machine for inserting said at least one wave wound coil into said stator stack;

a first transfer device for transferring said stator stack between said pallets and said insertion machine; and a second transfer device for transferring said at least one coil formed on said forming machine from said forming machine to said insertion machine so that said insertion machine can insert said at least one formed coil into said stator stack.

8. The production line of claim 7 wherein said insertion machine comprises a wedge inserting device for inserting wedges into said stator stack after said at least one wave wound coil has been inserted into said stator stack to hold said at least one inserted coil in place.

9. The production line of claim 7 wherein said forming machine comprises an indexer for maintaining a specific and known orientation between said at least one formed coil and said stator stack.

10. The production line of claim 7 wherein said first transfer device simultaneously transfers a coil inserted stator stack from said insertion machine to said pallet and transfers a stator stack to have a coil inserted therein from said pallet to said insertion machine.

11. The production line of claim 7 wherein said second transfer device transfers said at least one wave wound coil from said forming machine to said insertion machine on an insertion tool.

12. The production line of claim 11 wherein said second transfer device simultaneously transfers a wave wound coil from said forming machine to said insertion machine and transfers an empty insertion tool from said insertion machine to said forming machine.

13. The production line of claim 1 further comprising a plurality of prefinishing stations, each of said prefinishing stations comprising:

a coding device reader for reading said coded information; and a prefinishing machine for processing portions of said at least one inserted wave wound coil which protrude from said stator stack so that said protrusions do not interfere with said forming and insertion machines when said forming and insertion machines form and insert additional phase wave formed coils.

14. The production line of claim 13 wherein said prefinishing machine operates to move said protrusions radially away from an axis collinear with the bore of said stator stack.

15. The production line of claim 13 wherein said prefinishing machine processes said protruding portions only if said coded information indicates that fewer than all of said phases of said wave wound coils have been inserted into said stator stack.

16. The production line of claim 14 further comprising a final finishing machine which operates to move said protrusions radially towards said axis which is collinear with the bore of said stator stack.

17. A forming and insertion workstation for forming a wave wound coil and for inserting said wave wound coil in a stator stack which is on a coded pallet, said coded pallet containing at least information denoting contents of said pallet and production status of said contents, said workstation comprising:

an information reader for reading said coded information;

a forming machine for forming said wave wound coil, said forming machine forming said coil and placing said coil into an insertion tool;

an indexer for indexing said forming machine such that said wave wound coil is aligned in a specific and known orientation with respect to said stator stack, in response to said coded information;

an insertion machine for inserting said formed coil into said stator stack by transferring said coil from said insertion tool to said stator stack; and a first transfer device for transferring said insertion tool containing said formed coil from said forming machine to said insertion machine and for transferring empty insertion tools from said insertion machine to said forming machine.

18. The workstation of claim 17 further comprising a second transfer device which transfers a stator stack requiring a wave wound coil from a supply to said insertion machine and transfers a stator stack from said insertion machine after said insertion machine has inserted a wave wound coil therein, said second transfer device indexing said stator requiring a wave wound coil during said transfer such that said stack is aligned in response to said coded information.

* * * * *